Patented June 25, 1935

2,006,058

UNITED STATES PATENT OFFICE 2,006,058

PROCESS OF MAKING AMINES AND DI-AMINES AND PRODUCTS OF SAID PROCESS

John F. Olin, Dayton, Ohio, assignor to The Sharples Solvents Corporation, Philadelphia, Pa., a corporation of Delaware No Drawing. Application May 14, 1931, Serial No. 537,481

10 Claims. (Cl. 260—127)

This invention relates to the formation of amines and di-amines from chlorinated hydrocarbons. It relates particularly to the formation of mono-, di-, and tri-amyl amines from amyl mono-halides and the formation of amylene di-amines from amylene di-halides.

In accordance with this invention novel mono-, di-, and tri-amyl amines and mixtures thereof may be derived from a mixture of amyl chlorides resulting from the chlorination of pentanes such as are found in gasoline produced from natural gas, when the chlorination is effected by subjecting to heat in the absence of actinic light and in the absence of silent electric discharge a mixture of chlorine and such pentanes in vapor phase in accordance with the process described in patents of Eugene E. Ayres No. 1,741,393 and No. 1,717,136. For example, in such chlorination 15 parts of pentane vapor separated by rectification from natural gas may be mixed with one part of chlorine gas and passed at pressure of 75 lbs. per square inch through an externally heated reactor at a temperature of 280° C. for sufficient time to effect complete reaction. Upon cooling and rectifying, a mixture of amyl chloride is obtained, the following being a typical example thereof:

|  | Percent |
|---|---|
| 1-chlorpentane $CH_3.CH_2.CH_2.CH_2.CH_2Cl$ | 25 |
| 2-chlorpentane $CH_3.CH_2.CH_2.CHCl.CH_3$ | 17 |
| 3-chlorpentane $CH_3.CH_2.CHCl.CH_2.CH_3$ | 8.3 |

1-chlor-3-methyl butane  12.4

2-chlor-3-methyl butane 8.3

1-chlor-2-methyl butane 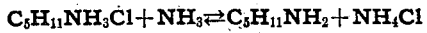 25

2-chlor-2-methyl butane 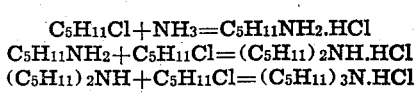 4

The above are isomeric amyl mono-chlorides the formulæ of which may be more generally written as $C_5H_{11}Cl$.

In the practice of this invention amyl mono-chlorides are converted into mono-, di-, and tri-amyl amines of the following general formulæ:

$C_5H_{11}NH_2$ mono-amyl amine
$(C_5H_{11})_2NH$ di-amyl amine
$(C_5H_{11})_3N$ tri-amyl amine To illustrate the practice of this invention, mono-, di-, and tri-amyl amines may be made from the mixture of isomeric amyl chlorides above referred to by reacting same with ammonia, and it is a feature of this invention that means are afforded for controlling the relative formation of mono-, di-, and tri-amyl amines. Thus if the amyl chloride isomers are treated with a great excess of ammonia (e. g. 6 to 10 times the theoretical molecular quantity), the formation of mono-amyl amines is favored. With smaller quantities of ammonia (e. g. 2 to 3 times the theoretical molecular proportion), considerable quantities of the di-amyl amines are formed. If still smaller quantities of ammonia are used, the product will be very high in tri-amyl amines. If the reaction is carried out in an aqueous solution with stirring and under pressure, the reaction will begin at about 150° C., but will not complete itself unless the temperature is held at 180° to 190° C. for some time. If a common solvent for the ammonia and amyl chloride is used such as alcohol, the reaction will take place at a lower temperature and may be completed after several hours at 100° to 110° C. It is convenient to use a solution of ammonia in 50% alcohol which may be readily obtained by mixing equal volumes of 95% alcohol and 28% ammonia.

Ammonia and amyl chloride tend to form amyl ammonium chloride but this substance is apparently dissociated when subjected to heat according to the reaction $$C_5H_{11}NH_3Cl \rightleftarrows C_5H_{11}NH_2 + HCl$$

with the formation of mono-amyl amine and free hydrochloric acid. This dissociation is probably aided by the presence of excess of ammonia, even though the amyl amines are stronger bases than is ammonia, with the formation in such case of ammonium chloride according to the reaction.

$$C_5H_{11}NH_3Cl + NH_3 \rightleftarrows C_5H_{11}NH_2 + NH_4Cl$$

Amyl-ammonium chlorides will not react with additional amyl chloride so long as they remain as salts, but when mono-amyl ammonium chloride, for example, is dissociated, the liberated mono-amyl amine will react with more amyl chloride to produce di-amyl ammonium chloride. The di-amyl ammonium chloride may in turn dissociate, giving free di-amyl amine which will react with additional amyl chloride to produce tri-amyl amine. In brief the reactions are as follows:

$$C_5H_{11}Cl + NH_3 = C_5H_{11}NH_2.HCl$$
$$C_5H_{11}NH_2 + C_5H_{11}Cl = (C_5H_{11})_2NH.HCl$$
$$(C_5H_{11})_2NH + C_5H_{11}Cl = (C_5H_{11})_3N.HCl$$

After the above reactions have proceeded as far as possible under predetermined controlled conditions, the amyl amines remain in solution in supernatant fluid in the form of salts. Treatment, however, with a strong inorganic base which does not form reversible salts with hydrochloric acid liberates the free base. An illustrative reaction of this type in connection with the mono-amyl ammonium salt is as follows:

$C_5H_{11}NH_2HCl + NaOH = C_5H_{11}NH_2 + NaCl + H_2O$

Similar reactions also will take place in connection with the di- and tri-amyl ammonium salts. Moreover, it is to be understood that other inorganic bases such as other alkali metal hydroxides or alkaline earth hydroxides, e. g. $Ca(OH)_2$ may be substituted for NaOH in the above illustrated reaction.

As an example of an operation in which tri-amyl amines predominated in the final product, 2,130 grams of mixed amyl chlorides were placed in an autoclave, 125 grams of ammonia in 2,000 c. c. of alcohol were added, and then there was added a cold solution of 800 grams of sodium hydroxide and 2,000 c. c. of water. The closed autoclave was heated to temperatures between 130° centigrade and 145° centigrade with stirring for five hours. An initial gauge pressure of about 225 lbs. per square inch occurred and the pressure dropped as the reaction progressed. After the autoclave cooled 4,000 c. c.'s of cold water were added and the oil which separated was removed with a separatory funnel. The oil was dried over solid sodium hydroxide and distilled. A small quantity of mono-amyl amines was recovered and also a quantity of amyl chloride, but the bulk of the product obtained consisted of about 200 grams of di-amyl amine boiling between 165° centigrade and 205° centigrade, and about 900 grams of tri-amyl amine boiling between 200° C. and 255° C. Thus, the yield of di- and tri-amyl amine was in the neighborhood of 75% of the theoretical.

In a typical operation in which mono- and di-amyl amines predominated in the product, 1,065 grams of mixed amyl chlorides were heated to temperatures between 100° C. and 110° C. for five hours with 680 grams of ammonia dissolved in anhydrous alcohol. After cooling, the solvent and excess ammonia were distilled off leaving a semi-solid mass of amyl-ammonium chloride. Steam was passed through this mass to remove the small proportion of amyl chloride therein. To the resulting solution there was added solid sodium hydroxide and stratification took place, the supernatant layer consisting of the three amyl amines and the lower layer consisting of a solution of sodium hydroxide containing sodium chloride. The amine layer was dried with flake caustic soda and distilled, producing a distillate containing about 500 grams of mono-amyl amine boiling between 85° C. and 110° C. and about 250 grams of di-amyl amines. The yield was slightly nearer the theoretical than in the preceding example.

In another illustrative example in which the yield of mono-amyl amine was high, 550 grams of amyl chloride, 1,000 c. c. of alcohol and 1,000 c. c. of 28% aqueous ammonia were heated to temperatures between 145° C. and 160° C. for eight hours at gauge pressure between 400 and 500 lbs. per square inch. After the material was cooled and transferred to a flask it was heated to remove excess ammonia and residual amyl chloride and some of the alcohol and water were distilled off, thus removing about one half of the volume of the final mass in the autoclave. Thereupon the residue was rendered alkaline by the addition of sodium hydroxide and further distillation carried over the mono-amyl amine and some of the di-amyl amine leaving in the flask the relatively smaller quantity of tri-amyl amine. The amines were then salted out of solution by further addition of sodium hydroxide which caused stratification. The supernatant layer was dried by still further addition of solid sodium hydroxide and it was filtered and distilled with reflux. The mono-amyl amines passed over between 75° C. and 105° C. and the di-amyl amines passed over between 175° C. and 205° C. The yield was about 55% of which 90% was mono-amyl amine.

In the practice of this invention it has been found that when the above-mentioned mixture of various isomers of amyl mono-chloride derived from the direct chlorination of pentanes with heat, are treated as above described to form amyl amines, that the amyl radicals occurring in the amyl amines correspond to the amyl radicals appearing in the amyl mono-chlorides. Thus amyl amines have been obtained in the practice of this invention having amyl radicals of the following formulæ:

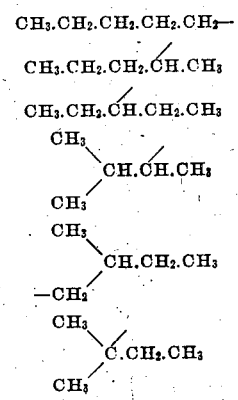

In the specification and claims it is to be understood that where reference is made to amyl compounds, that the term "amyl" is used in a general sense covering the various isomeric amyl radicals and covering mono-, di- and tri-amyl compounds. Thus the term amyl amine, for example, as used herein comprises mono-, di- and tri- amyl amines wherein the amyl radical or radicals may consist of any of the isomeric amyl radicals hereinabove discussed. Inasmuch as the amyl amines referred to hereinabove have but a single $NH_2$ group, the term amyl amine will be understood to refer to such substances and not to refer to substances hereinbelow to be discussed such as amylene di-amines which have two $NH_2$ groups. Moreover, it is to be understood that amyl amines can be made according to this invention from other amyl halides than amyl chloride.

While the mono-amyl amines are miscible with water, the di- and tri-amyl amines are but slightly soluble in water. They are all easily soluble in all organic solvents.

The amyl amines above mentioned are strong bases. Inasmuch as they very readily absorb acid gases such as carbon dioxide, hydrogen chloride, hydrogen sulphide and the like, they are effective and useful for gas scrubbing agents or for analogous purposes. Moreover, these substances are valuable reagents in the synthesis of other substances. For example, they can be used in the synthesis of thioureas and other substances useful as flotation agents. Moreover, they are useful in the preparation of dithiocarbamates as set forth in my application filed on even date herewith for Alkali metal mono- and di-amyldithiocarbamates and process of making same, Serial No. 573,482.

While this invention has been set forth in connection with the making of amyl amines it is to be understood that certain features of this invention are of general applicability in the formation of alkyl amines from alkyl chlorides or other halides where the alkyl radical is derived from the paraffin series of hydrocarbons. For example, the feature of reacting alkyl chlorides, for example, with ammonia to form alkyl ammonium chloride, dissociating the alkyl ammonium chloride to form alkyl amine and hydrochloric acid, and then reacting the free hydrochloric acid with additional ammonia or with an inorganic base substantially incapable of forming reversible salts, is of general applicability in the practice of this invention. Moreover, the formation of alkyl amines so as to either favor the formation of mono-alkyl amines on the one hand or poly-alkyl amines on the other by controlling the amount of ammonia used and by the use of inorganic bases substantially incapable of forming reversible salts is of general applicability.

It is to be understood that the process above described in connection with the making of amyl amines from amyl mono-chlorides also is applicable to the making of amylene di-amines from amylene di-chlorides or other di-halides. When amylene di-amine is made from amylene di-chloride, for example, two molecules of ammonia are required to react with the two atoms of chlorine in the amylene di-chloride instead of one molecule of ammonia reacting with one atom of chlorine as in the making of amyl amine. This difference from the reactions above given in connection with making amyl amine may be illustrated by the reaction whereby amylene di-ammonium chloride is formed from amylene di-chloride.

$$C_5H_{10}Cl_2 + 2NH_3 \rightarrow C_5H_{10}(NH_2)_2 \cdot 2HCl$$

In accordance with this invention amylene di-amines may be obtained from the mixture of amylene di-chlorides which are produced to a certain extent in the process above referred to for direct chlorination of pentanes with heat in addition to the amyl mono-chlorides above described. Moreover, by repeating the chlorination step in the above process and chlorinating amyl mono-chlorides with heat, the amyl mono-chlorides can be changed to amylene di-chlorides. A typical example of mixed amylene di-chlorides obtained as above described has been found to comprise the following constituents:

1-2-di-chlor pentane $CH_2Cl \cdot CHCl \cdot CH_2 \cdot CH_2 \cdot CH_3$ 2-3-di-chlor pentane $CH_3 \cdot CHCl \cdot CHCl \cdot CH_2CH_3$

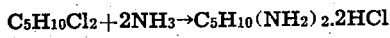
2-3-di-chlor-2-methyl butane $\genfrac{}{}{0pt}{}{CH_3}{CH_3}\!\!\diagdown\!\!CCl \cdot CHCl \cdot CH_3$ In the making of amylene di-amines from amylene di-chlorides the yield is markedly inferior to that obtained in making amyl amines from amyl mono-chlorides because of the tendency of the amylene di-chloride to split with hydrochloric acid with the formation of an unsaturated monochloride according to a reaction which is believed to be:

$$C_5H_{10}Cl_2 \rightarrow C_5H_9Cl + HCl$$

The reaction just illustrated is quite pronounced at temperatures necessary for reaction with ammonia. The reaction with amylene di-bromide under similar conditions gives a considerably better yield of amylene di-amine, as the reaction to form the di-amine occurs at a lower temperature in the case of the di-bromide.

As an example of an operation wherein amylene di-amine was formed, 500 grams of amylene di-chloride (or 700 grams of amylene di-bromide) were placed in an autoclave with 1,500 grams of 33% ammonia and 1,000 grams of alcohol saturated with ammonia at 0° C. The autoclave was then closed and heated for 6 hours at 120° to 130° C. at 500 pounds per square inch gauge pressure. After a while a slight drop in pressure was observed and the temperature was raised to 150° to 160° C. bringing the pressure to 700 pounds per square inch. On cooling, the material was withdrawn and evaporated almost to dryness, leaving a residue containing ammonium chloride, amylene di-amine-di-hydrochloride, pentenylamine hydrochloride, pentine, as well as the hydrochlorides of highly condensed amylene di-amines. A convenient method of extraction was afforded by treating the residue with 60% caustic potash or 50% caustic soda, warming to insure complete decomposition of the hydrochlorides, and then extracting with acetone or with absolute alcohol. After this extraction was completed the solvent was evaporated off and the crude amylene di-amine was subjected to a fractionation. Amylene di-amine was thus obtained boiling between 160° and 190° C. The yield was about 15% to 25% where amylene di-chloride was used and was about 25% to 30% where amylene di-bromide was used.

The amylene di-amine is a slightly yellow oil possessing a typically fishy amine odor. It is perfectly soluble in water and in organic liquids. The amylene di-amine is a very strong base.

By way of further illustration, olefinic di-amines such as amylene di-amine may be prepared by reacting olefinic di-halides such as the di-chlorides, for example, with ammonia and with an inorganic base which is substantially incapable of forming reversible salts. For example, olefinic di-chloride may be reacted with ammonia to form olefinic di-ammonium chloride and then upon dissociating the di-ammonium chloride to form di-amines and free hydrochloric acid, the free hydrochloric acid may be fixed by reacting it with an inorganic base that is substantially incapable of forming reversible salts with the hydrochloric acid. In such case the reactions occurring are believed to be

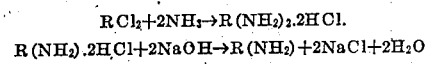
$$RCl_2 + 2NH_3 \rightarrow R(NH_2)_2 \cdot 2HCl$$
$$R(NH_2) \cdot 2HCl + 2NaOH \rightarrow R(NH_2) + 2NaCl + 2H_2O$$

wherein R is any olefinic radical of the general character $C_nH_{2n}$.

Where a mixture of amylene di-chlorides such as above described as resulting from the direct chlorination of pentanes or amyl chlorides (both of which will be referred to for the sake of brevity as the mixture resulting from the direct chlorination of pentanes with heat) is treated as above described to form amylene di-amines it has been found that the amylene radicals occurring in the amylene di-amines correspond to the amylene radicals occurring in the amylene di-chlorides. Thus, amylene di-amines have been obtained in the practice of this invention having amylene radicals of the following character.

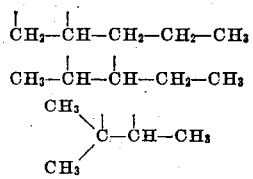

While the formation of amylene di-amine has been described hereinabove, it is to be understood that other olefinic di-amines can be prepared from olefinic di-halides such as di-chlorides and di-bromides by analogous procedure to that above described in connection with the formation of amylene di-amine. For example, ethylene di-amine may be formed by the method above described from ethylene di-chloride or di-bromide.

While specific illustrations have been above set forth of the practice of the invention, it is to be understood that this has been done for purposes of illustration merely and that the scope of this invention is not limited in any way thereby.

I claim:

1. A composition of matter comprising essentially the isomeric primary amyl amines formed as the reaction product between ammonia and the mixture of chlorpentanes derived from direct chlorination of pentanes with heat.

2. A method of making amyl amine which promotes the formation of mono-amyl amine comprising reacting amyl chloride with an amount of ammonia 6 to 10 times the theoretical molecular amount required for the reaction.

3. In the making of amyl amine by reaction between amyl chloride and ammonia the step comprising promoting the formation of mono-amine by including an excess of ammonia over the molecular amount theoretically required for the reaction in the reaction mass.

4. A method of making poly-amyl amine which comprises reacting amyl chloride with ammonia to form mono-amyl ammonium chloride, dissociating the mono-amyl ammonium chloride by the application of heat, and reacting the dissociated mono-amyl ammonium chloride with additional amyl chloride, to form poly-amyl ammonium chloride, and separating poly-amyl-amine from the poly-amyl ammonium chloride.

5. A method of making amyl amine which promotes the formation of tri-amyl amine which comprises reacting amyl chloride with ammonia in amount less than about 2 times the theoretical amount of ammonia required for the reaction in the presence of an inorganic base which is substantially incapable of forming reversible salts.

6. A method of making lower alkyl amines that favors the formation of poly-alkyl amines which comprises heating alkyl chloride with ammonia in less amount than about twice the theoretical amount required to react with the alkyl chloride and with an inorganic base capable of forming substantially irreversible salts, and recovering the alkyl amines resulting from the reaction.

7. A method of preparing amyl amine which favors the formation of mono-amyl amine and which comprises heating a mixture of amyl chloride and a large molecular excess of ammonia dissolved in anhydrous alcohol in an autoclave, and recovering amyl amine from the reaction products.

8. A method of preparing amyl amine which favors the formation of mono-amyl amine and which comprises heating a mixture of amyl chloride and a large molecular excess of ammonia dissolved in aqueous alcohol in an autoclave, and recovering the amyl amine from the reaction products.

9. A method of preparing amyl amine which favors the formation of tri-amyl amine and which comprises heating a mixture of amyl chloride, ammonia in amount about that which is required theoretically to react with the amyl chloride and a base substantially incapable of forming reversible salts with hydrochloric acid dissolved in aqueous alcohol in an autoclave, and recovering the amyl chloride from the reaction products.

10. A method of making lower alkyl amine which comprises reacting alkyl halide with ammonia in the presence of an inorganic base incapable of forming reversible salts with the reaction mass.

JOHN F. OLIN.